United States Patent
Petervary et al.

(10) Patent No.: US 8,057,880 B2
(45) Date of Patent: Nov. 15, 2011

(54) NON-OXIDE SELECTIVELY POROUS MATERIALS

(75) Inventors: Miklos P. Petervary, Culver City, CA (US); Min Zhou Berbon, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/969,543

(22) Filed: Jan. 4, 2008

(65) Prior Publication Data

US 2008/0102265 A1 May 1, 2008

Related U.S. Application Data

(62) Division of application No. 10/624,905, filed on Jul. 22, 2003, now Pat. No. 7,332,116.

(51) Int. Cl.
*B32B 3/24* (2006.01)
(52) U.S. Cl. ......................... 428/139; 428/137
(58) Field of Classification Search .................. 428/137, 428/139
See application file for complete search history.

(56) References Cited

U.S. PATENT DOCUMENTS

| | | | |
|---|---|---|---|
| 3,864,199 A | 2/1975 | Meginnis | |
| 3,940,532 A | 2/1976 | Smith, II | |
| 4,562,039 A | 12/1985 | Koehler | |
| 5,252,279 A | 10/1993 | Gore et al. | |
| 5,334,414 A * | 8/1994 | Edie et al. | 427/189 |
| 5,577,381 A * | 11/1996 | Eigenbrode et al. | 60/226.1 |
| 6,151,887 A * | 11/2000 | Haidn et al. | 60/257 |
| 6,190,602 B1 | 2/2001 | Blaney et al. | |
| 6,418,973 B1 | 7/2002 | Cox et al. | |
| 6,920,836 B2 | 7/2005 | Sprouse | |
| 7,303,597 B2 | 12/2007 | Sprouse et al. | |
| 2003/0052154 A1 | 3/2003 | Marshall et al. | |

FOREIGN PATENT DOCUMENTS

| | | |
|---|---|---|
| EP | 0257998 | 8/1987 |
| GB | 2323056 A * | 9/1998 |
| JP | 60-180800 | 9/1985 |
| JP | 63-60742 | 3/1988 |
| JP | 08-236093 | 9/1996 |
| JP | 2002-518209 | 6/2002 |
| WO | WO 99/65680 | 12/1999 |

OTHER PUBLICATIONS

Eric R. Trumbauer, John R. Hellmann, Linda E. Jones, "Oriented Microchannel Membranes Via Oxidation of Carbon-Fiber-Reinforced Glass Composites" Carbon, vol. 30, No. 6, 1992, pp. 873-882.
Berenburg, Barry, "Manufactures Welcome New Reinforcement Forms", Apr. 2003, found at www.compositesworld,com/ct/issues/2003/april/58/1.
Japanese Office Action for JP Patent Application 2004-204606 received Jun. 8, 2010.

* cited by examiner

*Primary Examiner* — William P Watkins, III
(74) *Attorney, Agent, or Firm* — Harness, Dickey & Pierce, P.L.C.

(57) ABSTRACT

A process for providing pores in a structure and a structure according to any selected physical characteristics. Generally pins or pore forming members may be positioned in a laminate preform and the laminate preform formed into a laminate structure including the pins therein. The pins generally include a size, density, distribution, angle, or other characteristic that is desired in the final laminate structure. After the laminate is formed the pins are then removed from the laminate according to a process which does not harm selected physical characteristics of the laminate structure.

22 Claims, 3 Drawing Sheets

NON-OXIDE SELECTIVELY POROUS MATERIALS

CROSS-REFERENCE TO RELATED APPLICATIONS

This application is a divisional of U.S. patent application Ser. No. 10/624,905 filed on Jul. 22, 2003 issued as U.S. Pat. No. 7,332,116 on Feb. 19, 2008. The disclosure of the above application is incorporated herein by reference.

FIELD

The present invention relates generally to forming porous materials, and particularly to methods of forming selectively porous laminate materials.

BACKGROUND

Many materials are known to be porous, generally being naturally porous. The naturally porous materials can be provided as filters or as transpiration coolers for various applications. Nevertheless, many natural materials include porosity that is also substantially "natural". Simply, the natural porosity of many materials is highly variable. Although porosity for various materials may be within a selected range, the porosity can be unevenly distributed throughout the material. Moreover, the natural porosity of a selected material may be within an extreme of a range rather than within a narrow porosity range.

Nevertheless, it is desirable to provide materials that include a selected porosity. Generally these materials will include a porosity that is substantially consistent throughout the material such that natural variations do not occur within the material or are inconsequential relative to the selected porosity. Therefore, the porosity will include a selected porosity and pore size. The entire material will have known physical characteristics and can be applied in a substantially consistent manner.

Moreover, most often porous materials include a substantially multi-directional porosity. That is, the porosity is distributed such that materials may move through the pores in multiple directions, from a first side to a second side and from the second side to the first side of the material as well as parallel to both sides. If the porous material is provided as a filter or membrane, then a pressure differential across the membrane must be relied upon to move the material in a selected direction. Generally, this requires including additional manufacturing steps or structural elements in the final structure or device.

Therefore, it would be desirable to provide a material that is substantially directionally porous. More specifically, it would be desirable to provide a material having a porosity that allows material to flow along one direction relative to the porous material surfaces. The flow may be dependent upon the material in which the pores are made or the material being flowed across the membrane. Nevertheless, the membrane is substantially uni-directional in its porosity for selected flowable materials.

It is also desired to provide many materials including selected porosities. That is, materials of various types including a selected porosity that includes a selected pore density, selected pore size, and selected directional porosity. Therefore, rather than providing only a single material including a selected porosity with a general technique, the materials could be varied and used in many different applications including different strengths and weight requirements.

SUMMARY

The invention provides a system for providing pores in a structure according to selected properties. Generally a structure, such as a laminate, may be formed with a selected pore according to a selected porosity or other physical attributes. The porosity may be formed by positioning pins or a pore forming member through a laminate preform before the preform is laminated to form the laminate structure. After forming the laminate structure the pins can be removed according to various processes which do not harm the physical characteristics of the laminate structure. Therefore, the porosity of the final laminate material is provided according to a selected size, direction, and porosity rather than being generally random according to a natural process.

According to a first embodiment of the invention a method of forming a pore in a laminated material is disclosed. The method includes forming a laminate preform including a plurality of layers of material. A member is disposed at least partially through the laminate preform. The laminate preform may be processed to form a substantially laminated structure. The member is removed from the laminated structure. Removing the member is accomplished with substantially little oxidation and leaves a pore having at least one of desired shape and size.

According to a second embodiment of the present invention a method for forming a laminate material including a selected pore is disclosed. The method includes selecting a substantially oxide-free fabric and forming a fabric stack including at least one layer of the selected substantially oxide-free fabric to be laminated into a substantially coherent laminate structure. A pin is placed into the fabric stack and then the fabric stack is laminated such that the fabric stack becomes laminated into a laminated structure. The pin is then removed from the laminated structure to form a substantially selected pore in the laminated structure.

According to a third embodiment of the present invention a high strength panel providing a desired degree of porosity is disclosed. The high strength panel includes a laminated substrate including a plurality of independent layers of material placed adjacent one another. The panel further includes a plurality of pores formed in the laminated substrate by the placement of a plurality of pore forming members in at least a selected one of the plurality of independent layers of material prior to forming the laminated substrate. The plurality of pore forming members is held in the selected plurality of independent layers of material until the laminated substrate is fully formed and then removed from the laminated substrate to form the pores.

According to various embodiments, a construct providing a desired degree and characteristic of porosity is disclosed. The construct can include a laminated substrate including a plurality of independent layers of material placed adjacent one another and a plurality of pores formed in the laminated substrate by the placement of a plurality of pore forming members in at least a selected one of the plurality of independent layers of material prior to forming the laminated substrate. The plurality of pore forming members are held in the selected plurality of independent layers of material until the laminated substrate is fully formed and then destroyed in the laminated substrate to form the pores.

According to various embodiments, a construct for a structure including a substantially selected porosity is disclosed. The construct can include a laminate preform including a plurality of layers of material operable to be processed into a laminated structure and a member operable to be positioned at least partially through the laminate perform, wherein the member includes a selected profile such that a pore left in the laminated structure by the member allows a substantially uni-directional flow of a flowable material. The member is operable to be destroyed from within the laminated structure to form a pore in the laminated structure with at least one of substantially little oxidation and degradation to the laminated materials. The construct can also include a structure operable to be disposed adjacent to the laminated structure. The flowable material is operable to move through the pore in the laminated structure to cool the structure.

According to various embodiments a construct including panel providing a desired degree and characteristic of porosity is disclosed. The construct can include a substantially coherently laminated structure formed from a substantially oxide-free fabric stack and a pin operable to be placed into the fabric stack, the pin having a selected profile such that a selected pore remaining in the laminated structure allows for substantially uni-directional flow of a flowable material through the laminated structure. The pin is removed from the laminated structure to form the substantially selected pore in the laminated structure.

According to various embodiments a method of forming a laminated panel having a plurality of uni-directional pores is disclosed. The method can include forming a laminate preform including a plurality of layers of material and disposing a plurality of pore forming members in the laminate preform in a selected pattern. The method can further include processing the laminate preform to form a laminated structure and abolishing the pore-forming members in the laminated structure to form a plurality of uni-directional pores in the laminated structure.

Further areas of applicability of the present invention will become apparent from the detailed description provided hereinafter. It should be understood that the detailed description and various examples are intended for purposes of illustration only and are not intended to limit the scope of the invention.

BRIEF DESCRIPTION OF THE DRAWINGS

The present description will become more fully understood from the detailed description and the accompanying drawings, wherein.

DETAILED DESCRIPTION

The following description of various embodiments is merely exemplary in nature and is in no way intended to limit the invention, its application, or uses.

Figure 1:
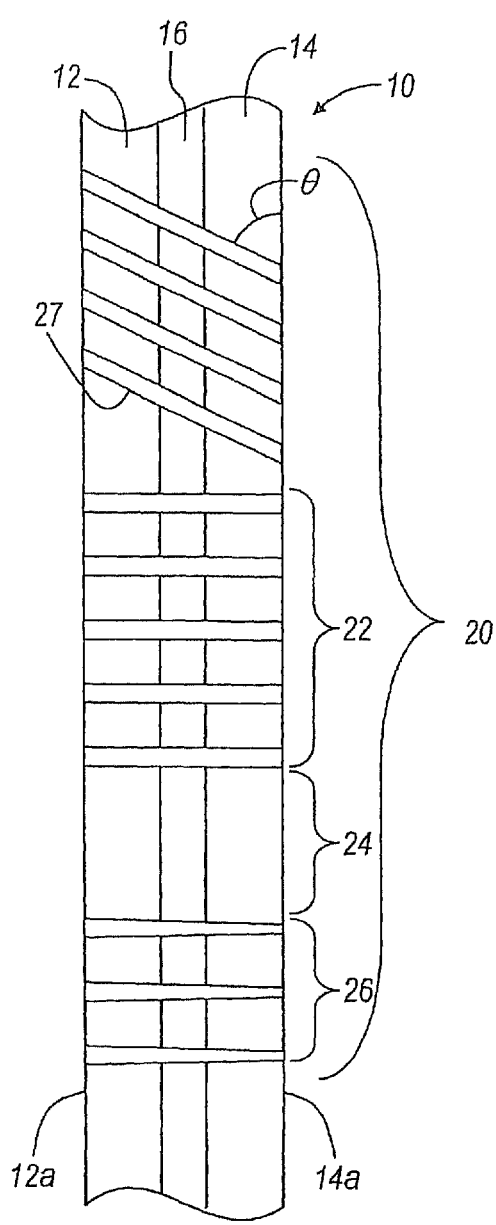
FIG. 1 is a cross-sectional view of a laminate including pores according to an embodiment of the present invention.

With reference to FIG. 1, a laminated structure 10 includes at least two layers, a first layer 12 and a second layer 14 formed generally adjacent one another. In addition, an intermediate layer 16 may be formed or positioned between the first and second layers 12, 14. The intermediate layer 16 may be used for adhering the first and second layers 12, 14 to one another during a formation or laminating process. Nevertheless, it will be understood that laminated layers may include a pre-impregnated material which can be used to affix the first and second layers 12, 14 together during the formation process. Alternatively, the first and second layers 12, 14 may be fixed to one another, during the formation process, without any additional adhesive material. Also, it will be understood that the laminate structure 10 may include any number of appropriate layers. Simply, the first layer 12 affixed to the second layer 14 is shown for clarity and is merely exemplary and not intended to limit the scope of the present disclosure. Therefore, the laminate structure 10 including any appropriate number greater than the two structural layers 12, 14 and a single intermediate layer 16 may be used.

Formed through the laminate 10 is a plurality of bores or pores 20. The pores 20 can be formed through the laminate 10 in any appropriate or selected manner. Generally, however the pores 20 are formed such that a uniform density or porosity is formed in a selected area such as a first set of pores 22. Moreover, the pores may be formed such that a non-porous area 24 is also formed. Furthermore, the pores 20 may be formed to include desired physical characteristics such as being uni-directional. For example, uni-directional pores 26 allow the flow of a flowable material from a first side 12a to a second side 14a. A fourth exemplary formed pore includes an angled pore 27 which is formed at a selected angle θ to a side of the laminate 10. This allows the material to flow to a selected area relative to the laminate 10. It will be understood that the uni-directional pores 26 may also be formed such that material flows substantially only from the second side 14a to the first side 12a. In addition, due to the formation of the uni-directional pores 26, it may be that the uni-directional pores 26 are positioned in any selected area of the laminate 10.

The first laminate layer 12 and the second laminate layer 14 may generally be formed of any appropriate material, for example non-oxide materials. For example, the first layer may be formed substantially of a carbon reinforced silicon carbide material while the second layer 14 is formed substantially of a carbon reinforced carbon (Carbon-Carbon) material. Alternatively, both the first layer 12 and the second layer 14 may be formed of a carbon fiber reinforced silicon carbide material formed in an appropriate manner. Generally, the non-oxide first and second layers 12, 14 are formed to include selected physical characteristics, such as strength or durability. In addition, the first and second layers 12, 14 may be formed of a material that includes other physical characteristics such as thermal or electrical conductivity. The non-oxide materials may also be reinforced with carbon, silicon carbide, or other ceramic or metal fibers. Nevertheless, when the first and second layers 12, 14 are laminated together in the laminate 10, selected physical characteristics are found within the laminate 10. Moreover, the pores 20 formed in the laminate 10 are formed without destroying the selected physical characteristics of the laminate 10. Thus the laminate structure 10 may include both selected physical properties and porosity.

If the first layer 12 and a second layer 14 were individually porous providing the intermediate layer 16 may interrupt the continuous porosity from the first side 12a to the second side 14a. In addition, if the first layer 12 and the second layer 14 were inherently porous, the porosity may not be substantially continuous or uniform over the entire surface of the laminate 10. Therefore, the porosity would be unknown at various areas of the laminate material 10.

Therefore, forming the pores 20 through the laminate 10 as the laminate 10 is formed substantially ensures that the porosity or the pores 20 formed in laminate 10 are formed in a selected manner and according to selected requirements. Moreover, forming the pores 20 during the manufacturing of the laminate 10 ensures that the formation of the pores 20 or the presence of the pores 20 does not destroy the selected physical or chemical characteristics of the laminate 10.

Figure 2:
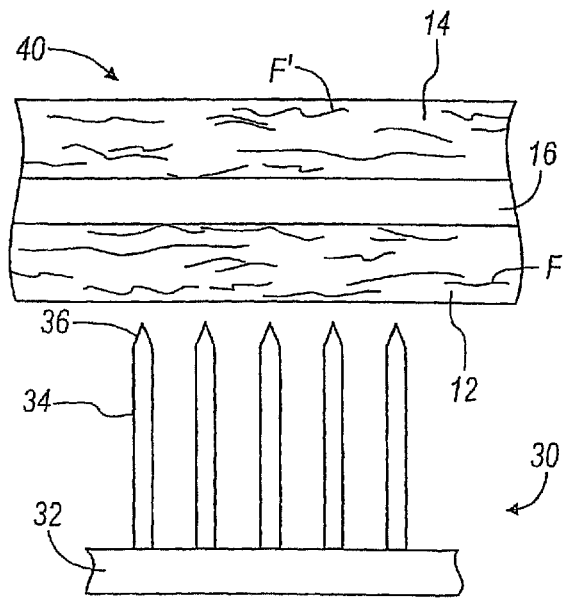
FIG. 2 is an exploded view of the laminate and a pore forming apparatus.

With reference to FIG. 2, the pores 20 (illustrated in FIG. 1) may be formed using a pore forming apparatus 30. The pore forming apparatus 30 generally includes a base 32 and a plurality of pins or pore forming members 34 extending from the base 32. Generally, the pins 34 include a substantially sharpened top or engaging end 36 that is used to pierce a portion of a laminate preform 40. The laminate preform 40 includes each of the layers which will eventually form the laminate structure 10, but which have not yet been laminated (in other words, the process to make each of the layers 12, 14 substantially coherent has not yet occurred). The layer 12, 14 of the laminate preform 40 may also include reinforcing fibers F, F'. The reinforcing fibers F, F' may be any appropriate material to provide selected properties to the layers 12, 14. The reinforcing fibers F' in the first layer 12 may be the same or different than the fibers F' in the second layer. The pins 34 pierce the laminate preform 40 to form desired pores in the laminate preform 40 which will become the pores 20 once the pins 34 are removed.

The pins 34 are also able to move the fibers F, F' during the insertion of the pins 34. Therefore, the pins 74 do not destroy the fibers F, F' nor the properties they impart to the laminate 10, once formed.

Figure 3:
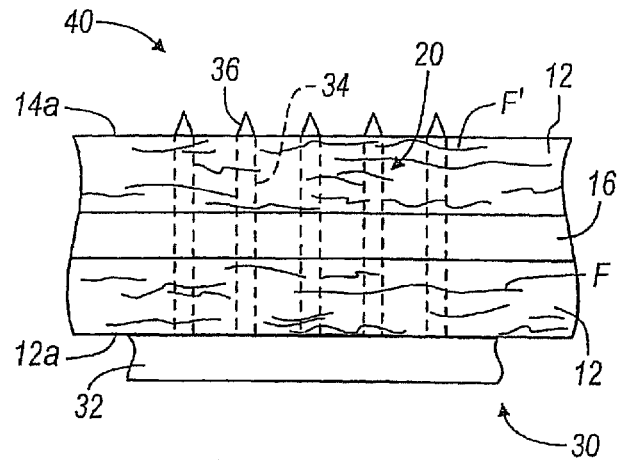
FIG. 3 is an assembled view of a laminate and a pore forming apparatus.

With continued reference to FIG. 2 and additional reference to FIG. 3, the laminate preform 40 is pressed onto the pins 34 to a selected depth or distance. During this process, the sharpened ends 36 and the pins 34 are able to move the fibers F, F' rather than break them. In the unprocessed state, the fibers F, F' are able to move within the layers 12, 14 rather than breaking. Generally, the pins 34 include a height selected to provide a desired pore depth into the laminate structure 10. Generally, pores are formed through laminate structure 10 such that a flowable material is able to pass from the first side 12a to the second side 14a. The pore forming apparatus 30 can be pressed through the laminate preform 40 or the laminate preform 40 pressed onto the pore forming apparatus 30. Nevertheless, the pins 34 engage and typically pass through each of the layers of the laminate preform 40 to form regions that become the pores 20 in the laminate structure 10.

The pins 34 may be formed or placed on the base 32 of the pore forming apparatus 30 in any appropriate shape or pattern. Moreover, the pin forming apparatus 30 may be shaped to any appropriate geometry. In this way as the laminate preform 40 is placed over the pore forming apparatus 30, it conforms to the shape of the pore forming apparatus 30 such that a complimentary shape or a similar shape is formed in the laminate preform 40 as the pores 20 are formed in the laminate preform 40.

Because the pins 34 may be positioned on the base 32 in any appropriate configuration or pattern, selected porosities or designs of porosities can be formed in the laminate 10. In addition, each of the pins 34 positioned on the base 32 may be of a selected size or geometry. Therefore, a first set of the pins 34 may be a first size, while a second set is a different size. Moreover, the pins 34 may include a uni-directional pore shape, such that the flowable material passes only in one direction, and again only some of the pins placed on the base 32 may include this attribute while others do not. Moreover, the pins 34 may pierce at some selected angle so as to create pores at the selected angle θ.

Figure 4A:
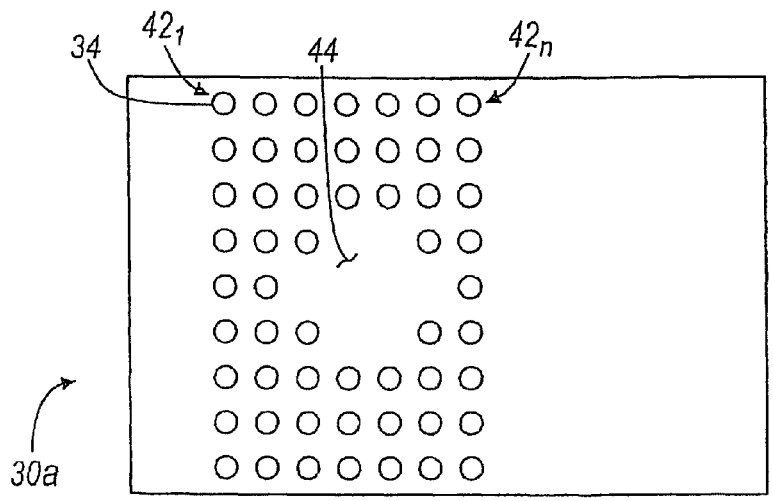
FIG. 4A-4C is a pore forming apparatus according to various embodiments of the present invention.
Figure 4B:
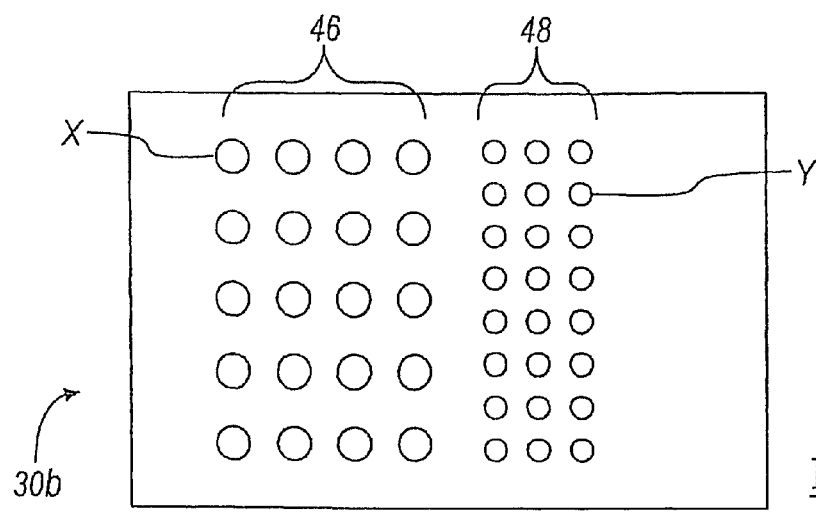
Figure 4C:
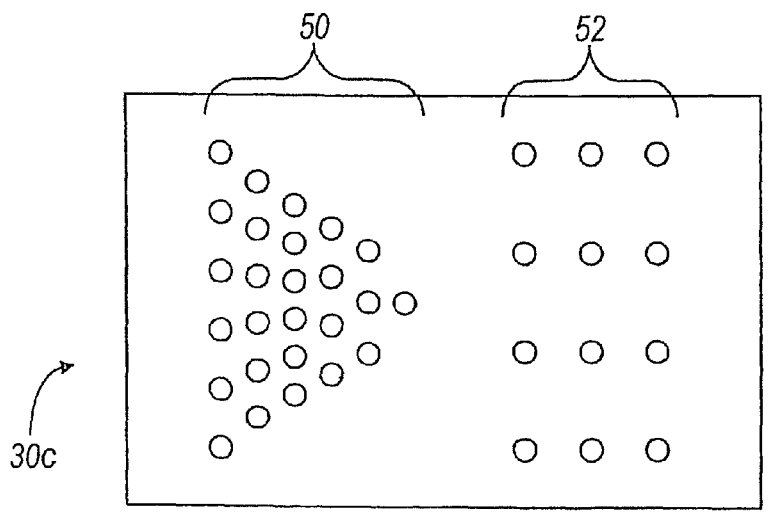

With reference to FIG. 4A to 4C, exemplary pore forming geometries are illustrated. With particular reference to FIG. 4A, the pore forming apparatus 30a includes a plurality of the pins 34 formed in a plurality of rows $42_1$ $_{to}$ $42_n$. An opening 44 is left in the pattern such that pores will not be formed in a selected area of the laminate 10. The open area 44 may be any appropriate shape or size and may used for forming an opening or hole in the laminate 10. Particularly, if there is an opening for a rod or tube, no pores would be formed therein.

With particular reference to FIG. 4B, the pore forming apparatus 30B includes a first set of pins 46 having a first diameter X and a second set of pins 48 having a second diameter Y. The first diameter X may be any diameter different than the diameter Y. Therefore, the laminate 10 will have pores formed therein that include pores of various sizes. This may be desirable especially if the laminate 10 is to be used to cover to adjacent sections requiring a different size pore in each section. This technique may also be used to vary the rate of material transport across different portions of the laminate 10.

With particular reference to FIG. 4C, a pore forming apparatus 30c includes a first section of pins 50 and a second section of pins 52. The first section pins 50 may be formed in a particular pattern, such as a triangle for forming pores in the laminate 10 in the selected pattern. Moreover, the pins in the first section 50 include a first density which is different than the density of the pins in the second section 52. Furthermore, the shape or general pattern of the second set of pins 52 may differ from the first set of pins 50. Therefore, several different pore forming apparatuses can be produced to provide various different porosities, pore sizes, pore shapes or pore patterns. In this way, the laminate 10 may include a porosity of any selected manner.

Figure 5:
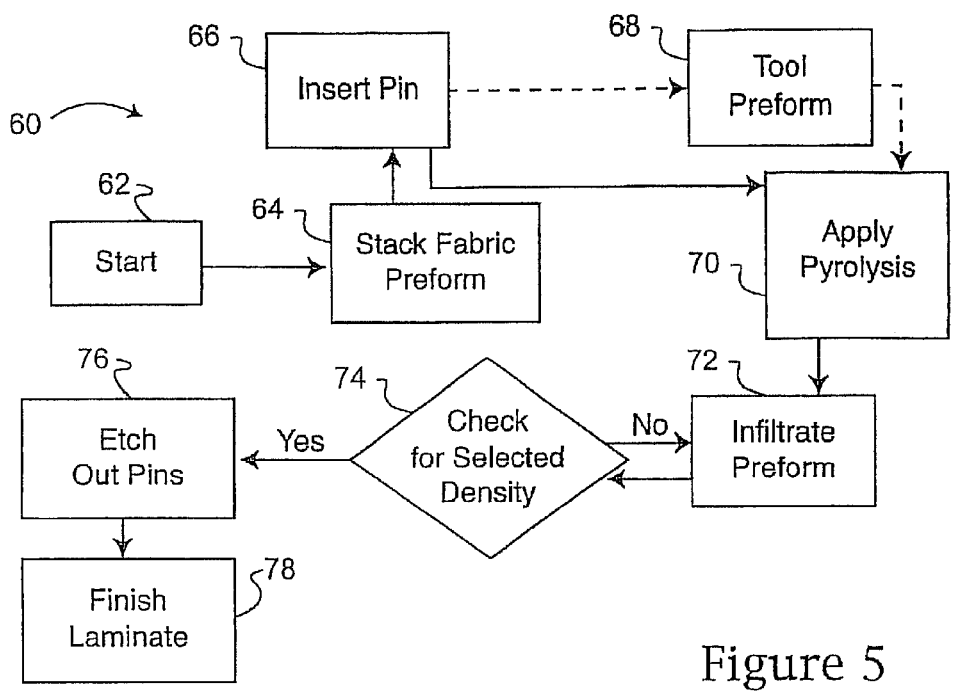
FIG. 5 is a flow chart for pore forming according to an embodiment.

With reference to FIG. 5, a flow chart of a method 60 for forming the porosity in laminate 10 is illustrated. The method 60 begins at step 62. After the process has started, a fabric stack or a fabric preform is formed in step 64. That is, that the first layer 12 and the second layer 14 of the laminate preform 40, before being laminated into a final laminate structure 10, are formed into the desired shape or size for being laminated. The first and second layers 12, 14 may be formed into a shape and size at the perform stage for which is required for the final laminate structure 10.

After the stack fabric perform is formed in step 64, the pin can be inserted in step 66. For example, glass or molybdenum pins can be inserted at step 66 into the fabric preform. It will be understood that the pins may be inserted into the preform, formed in step 64, according to any selected size, porosity, or shape, as discussed above.

After the pins are inserted into the fabric preform at step 66, the fabric preform may be tooled or worked at step 68. It will be understood that such tooling may not be desirable in the preform stage; therefore tooling is not necessary for carrying out the method 60. Nevertheless, certain tooling may be used to further modify the preform to achieve a desired shape or size. After the selected tooling is used or directly after the glass pins are inserted in block 66, an interfacial coating is deposited upon the fiber preform utilizing chemical vapor deposition or polymer pyrolisis in step 70.

After the pins have been inserted in step 66 and the interfacial coating is applied in step 70, the preform is infiltrated in Block 72 with a matrix material for example a silicon carbide ceramic via a polymer infiltration and pyrolysis (PIP), liquid metal melt infiltration (MI), or chemical vapor deposition (CVD) process. The preform is infiltrated with the material to allow lamination of each of the layers in the preform. After the preform is infiltrated, a check for an appropriate density is done at step 74. If the material is not found to have a selected density, further infiltration is done of the preform in step 72.

Once the selected density is reached of the infiltrated preform, the pins may be etched out in step 76. The pins may be removed by destroying or abolishing the pins, such as by etching out in step 76 according to any appropriate manner. It will be understood the pins are generally destroyed during removal such that they are unusable yet the process leaves intact selected properties of the laminate. For example, the pins may be generally etched out by chemical etching of the pins from the laminate structure 10. That is, that the glass or metal forming the pins that were placed in the preform are etched out with a chemical that does not react with the laminate materials, but only with the glass pins. Therefore, it will be understood, that the pins are inserted into the preform in step 64 and remain in place until after the laminate structure has been laminated or infiltrated in step 72. Thus, the pins inserted in step 66 are not removed from the preform structure until after the laminate structure is completely formed.

After the glass pins are etched out in step 76, the laminate is finished in step 78. The laminate finishing 78 may include any appropriate steps such as inspection, machining, and cleaning. Moreover, testing of the physical properties of the laminate may be done in the finishing step in step 78. If initial tooling was not done, or if initial tooling is done, final tooling of the laminate structure may be desirable in the finishing step 78 to provide for the selected structure shape or size.

Figure 6:
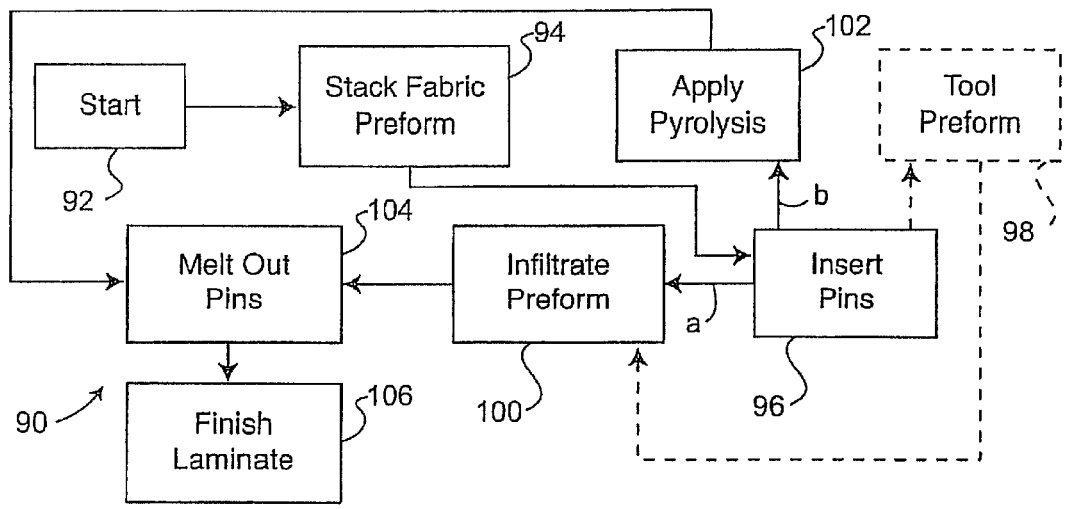
FIG. 6 is a flow chart for pore forming according to an alternative embodiment.

With reference to FIG. 6, a second exemplary method to form the laminate 10 is illustrated according to a flow diagram 90. The second method 90 begins at start block 92. After the start block 92, a stack fabric preform is formed in step 94. The fabric preform may be formed substantially similar to the fabric preform 64 according to the method 60. Polymer pins are inserted at step 96 into the fabric preform formed at step 94. After the stack fabric preform is pinned at step 96, the preform may be tooled at step 98. The pinned preform, tooled or untooled, is then infiltrated at step 102 for lamination of the layers. Alternatively, for a ceramic laminated material, this process utilizes a polymer ceramic precursor which is solidified through a cure or drying process, which is pyrolized at step 102 to convert it into the desired ceramic. In one example, this may be the process to form silicon carbide around carbon fibers.

After the polymer pins are inserted into the fabric preform, the fabric preform is infiltrated with a selected polymer ceramic precursor or material at step 102. The infiltration allows for the laminate structure to form between the various layers of the stack fabric preform. The infiltration of the preform at step 102 substantially provides the density required for the laminate structure. Although a checking process or step may follow the infiltration of the preform after step 102, the infiltration process is not generally repeated according to the method 90.

After the fabric preform has been infiltrated at step 102 and rigidized (i.e. cured), the polymer pins may be melted out at step 104. More specifically, the laminated structure, including the polymer pins inserted therein, which was inserted into the preform at step 100, are destroyed or abolished. For example, the pins may be melted during the curing step. Generally the temperature required to melt out the polymer pins at step 104 is a temperature below that which substantially disrupts the structure of the laminate structure. Rather than injuring the structure of the laminate structure formed after the infiltration at step 102, the pins are simply melted out at step 104. This allows a substantially porous structure according to any selected design.

After the polymer pins are melted out of the laminate structure the polymeric infiltrant is pyrolized according to the prescribed PIP process and converted into a ceramic in Step 102. It will be understood that PIP step 102 may occur at any appropriate time. The laminate is then finished in step 106. Similar to the laminate finish at step 78, various steps may be performed to finish the laminate at step 106. For example, the laminate structure may be examined for the desired physical and chemical properties, structure machined and cleaned. Furthermore, permeability testing of the laminate structure may occur to ensure that the selected permeability properties have been formed by the placement of the polymer pins into the preform in block 100.

Generally, the materials for forming the laminate structure 10 are substantially non-oxide materials. Moreover, the materials forming the laminate structure 10 may be disrupted by oxidation of the materials in the various layers. Therefore, removing the pins, through any appropriate method, does not substantially oxidize the material of the laminate structure 10. To that end the pins may be selected of a material that may be removed using processes which do not substantially oxidizing the layers of the laminate 10.

Moreover, the materials forming the layers 12, 14 of the laminate structure 10 allow for a substantially strong laminate. The placement of the pins 34 allow for the laminate structure 10 to be selectively porous. Therefore, a high strength laminate structure 10 or panel can be provided with a desired degree of porosity. The laminate preform 40 includes a plurality of independent layers of material placed adjacent one another. Then, as described above, a plurality of pores are formed in the laminate structure 10 by placing the pins 34 in the laminate preform 40. The plurality of pore forming members 34 are held in a selected plurality of independent layers of material until said laminated structure 10 is fully formed. Then the pins 34 are removed from the laminated substrate to form the pores 20.

For example, the pins may be formed from a polymer material of a selected diameter or density to penetrate the preform which can then be melt or burnt out during a pyrolysis cycle. Alternatively, a glass or metallic fiber may be used that can be etched out substantially easily following one or several infiltration cycles as determined by the particular infiltration method prescribed. Although it will be understood that these are merely exemplary in nature and any appropriate materials for forming the pins 34 for the pore forming structure 30 may be used.

In addition, the materials for forming pins 34 generally do not interact with the infiltration for formation of the laminate structure. More specifically, that the pins remain in place during the formation of the laminate but are easily removed afterwards to leave the desired porosity or pore size in the laminate structure 10. Therefore the pins do not generally interact with the infiltration material and generally only sublime or burn out when selected. Nevertheless, pins are provided that can be pressed through the preform laminate material without substantially deforming or substantially damaging reinforcements disposed in the laminate layers.

The laminate structure 10 may be used for any appropriate use. Exemplary uses are described in U.S. Pat. No. 7,128,532, issued Oct. 31, 2006, entitled, "A TRANSPIRATION COOLING SYSTEM" to Miklos Petervary, and commonly assigned, incorporated herein by reference. For example the laminate structure 10 including the pores 20 may be used for transpiration cooling of a structure. In a further example, the laminate structure 10 may be used as the hot wall of a combustion chamber where a flowable cooling material that is flowed on the backside could then flow through the pores 20 at a selected rate to cool the hot wall surface. The laminate structure 10, however, includes the selected porosity so that the selected flow rate occurs. Moreover, the substantially consistent porosity assures that the porosity is present in the laminate structure 10 at the selected area thus providing uniform transpiration and therefore uniform cooling.

The description is merely exemplary in nature and, thus, variations that do not depart from the basic premise of the description are intended to be within the scope of the description. Such variations are not to be regarded as a departure from the spirit and scope of the description.

What is claimed is:

1. A construct for a structure that has a selected porosity, comprising:
    a laminate preform including a plurality of layers of non-oxide material operable to be processed into a laminated structure wherein the laminated structure includes the selected porosity;
    a member formed of glass to be positioned at least partially through said laminate preform without disrupting a reinforcing fiber in the non-oxide material to allow formation of the selected porosity, wherein the member includes a profile having a first dimension at a first end and a second dimension lesser than the first dimension at a second end such that a pore left in said laminated structure by said member has a third dimension equivalent to said first dimension at a first end near a first side of said laminated structure and a fourth dimension equivalent to said second dimension at a second end at a second side of said laminated structure and allows a substantially uni-directional flow of a flowable material;
    wherein the member is removed from within said laminated structure only after curing of said laminate preform to form the laminated structure and to form the selected porosity in said laminated structure with substantially little oxidation or degradation to the laminated structure;
    wherein a structure is operable to be disposed adjacent to said laminated structure, wherein the flowable material is operable to move through the selected porosity in the laminated structure to cool said structure.

2. The construct of claim 1, wherein the member includes a plurality of members operable to provide the selected porosity in said laminated structure when the plurality of members are removed from said laminated structure to form the selected porosity in the laminated structure.

3. The construct of claim 2, wherein the member has at least one of a selected size, shape, dimension, and property;
    wherein the member has a side that tapers from said first end to said second end and will form an angle relative to a side of the laminate preform.

4. A construct including panel providing a selected porosity, comprising:
    a substantially coherently laminated structure formed from a substantially oxide-free fabric stack; and
    a plurality of molybdenum pins placed into the fabric stack, each molybdenum pin of the plurality of molybdenum pins having a profile that is wider at a first end of the pin than at a second end of the pin such that a selected pore remaining in the laminated structure is wider at a first end than at a second end and allows for substantially uni-directional flow of a flowable material through the laminated structure;
    wherein the molybdenum pin is removed from the laminated structure to form the selected porosity in the laminated structure after the laminated structure is formed from the substantially oxide-free fabric stack;
    wherein said fabric stack includes a first layer of the fabric and a second layer of the fabric positioned in a selected orientation for forming the laminated structure;
    wherein the plurality of molybdenum pins are positioned through each of the first layer of the fabric and the second layer of the fabric stack without substantially disrupting the selected orientation of each of said layers or reinforcing fibers in the first layer of the fabric or the second layer of the fabric;
    wherein the plurality of pins forms a plurality of pores that define a porous field defining an area of pores in the laminated structure;
    wherein the laminated structure further defines a non-porous field having no pores formed by the plurality of molybdenum pins.

5. The construct of claim 4, further comprising:
    a coolable structure to be cooled;
    wherein the substantially coherently laminated structure is positioned a selected distance from the coolable structure;
    wherein the flowable material is operable to flow in a uni-directional flow through said laminated structure to cool the coolable structure.

6. The construct of claim 4, wherein the substantially oxide-free fabric includes carbon reinforced silicon carbide material and/or carbon reinforced carbon (Carbon-Carbon).

7. The construct of claim 4, wherein the molybdenum pin is to having one of a plurality of external widths such that a first pore includes a first internal dimension and a second pore includes a second internal dimension;
    wherein the first internal dimension and the second internal dimension are different;
    wherein the first pore and the second pore are both within the porous field.

8. The construct of claim 4,
    wherein the laminated perform is operable to be positioned adjacent a pore forming apparatus including having a base;
    wherein the molybdenum pin includes a plurality of molybdenum pins each positioned to extend from the base;
    wherein at least one of the plurality of the molybdenum pins includes a substantially sharpened engaging end that is used to pierce a portion of the fabric stack.

9. The construct of claim 4, wherein the pore includes an angled pore having a side formed at a selected angle to a side of the laminate structure;
    wherein the selected angle is selected to allow a flow in only one direction through the laminated structure.

10. The construct of claim 9, wherein the angle of the pore relative to a side of the laminated structure is substantially identical to an angle of the molybdenum pin.

11. A member having a selected degree and characteristic of porosity, comprising:
    a laminated member that is formed by curing a pre-formed laminate of a plurality of independent layers of material placed adjacent one another;
    a plurality of pores formed in said laminated member by a placement and subsequent removal of a plurality of pore forming members, wherein the pore forming members are placed in at least a selected one of said plurality of independent layers of material prior to forming said laminated member and the pore forming members are removed from the at least a selected one of said plurality of independent layers of material subsequent to forming said laminated member; and wherein the plurality of pore forming members are held in said at least one selected of said plurality of independent layers of material until said laminated structure is fully formed and wherein the then the plurality of pore forming members are destroyed from within said laminated member to form said plurality of pores;

wherein the material of each of the plurality of independent layers is formed of a substantially oxide-free fabric including at least reinforcing polymeric fibrous materials;

wherein the pore forming members are formed of at least one of molybdenum or glass.

12. The member of claim 11, wherein the plurality of pore forming members are destroyed by chemically etching the pore forming member from the laminated member;

wherein the plurality of pore forming members are destroyed with at least one of substantially little oxidation or degradation to the laminated member.

13. The member of claim 11, wherein the plurality of pore forming members are destroyed by at least one of sublimation or melting;

wherein the plurality of pore forming members are destroyed with at least one of substantially little oxidation or degradation to the laminated member.

14. The member of claim 11, wherein the plurality of pore forming members are formed of glass and positioned in at least two of the independent layers, wherein the pore forming member formed of glass is destroyed to form substantially continuous pores through the at least two layers of the laminated member.

15. The member of claim 14, wherein the laminated structure is operable to be shaped on a tool operable to shape the independent layers.

16. The member of claim 14, further comprising:

at least a sub-plurality of the plurality of pores in said laminated structure having a first dimension at a first end near a first side of said laminated structure and a second dimension at a second end at a second side of said laminated structure to allow the uni-directional flow;

wherein the laminated structure including the plurality of pores is operable to be placed near a coolable structure to be cooled;

wherein the laminated structure is substantially coherently laminated;

wherein the substantially coherently laminated structure is positioned a selected distance from the coolable structure;

wherein a flowable material is operable to flow in a uni-directional flow through said laminated structure to cool the coolable structure.

17. The member of claim 14, wherein the pore forming members are operable to be selected of a plurality of external widths such that a first pore includes a first internal dimension and a second pore includes a second internal dimension;

wherein the first internal dimension and the second internal dimension are different.

18. The member of claim 14, wherein the plurality of pores define a field of substantially porous area in the laminated structure;

wherein an area within the fields includes substantially no pores formed by the pore forming members.

19. The member of claim 14, wherein the plurality of pores define a field of substantially porous area in the laminated structure;

wherein a first portion of the field includes a first density of pores and a second portion of the field includes a second different density of pores.

20. The member of claim 14, further comprising:

a base;

wherein each of the plurality of the pore forming members extends from the base;

wherein at least one of the pore forming members includes a substantially sharpened engaging end that is used to pierce a portion of the plurality of independent layers of material prior to the laminated member being cured.

21. The member of claim 12, wherein the plurality of the pore forming members are formed of molybdenum and capable of surviving final processing of the independent layers into the laminated member and thereafter being destroyed, and wherein the plurality of the pore forming members are positioned in at least two of the independent layers to form substantially continuous pores through at least two layers of the laminated member.

22. The construct of claim 21, wherein the plurality of independent layers of material are selected from a group consisting of carbon reinforced silicon carbide material and/or carbon reinforced carbon (Carbon-Carbon).

* * * * *